US011270083B2

(12) United States Patent
Mizrahi et al.

(10) Patent No.: US 11,270,083 B2
(45) Date of Patent: Mar. 8, 2022

(54) OBTAINING TRANSLATIONS UTILIZING TEST STEP AND SUBJECT APPLICATION DISPLAYS

(71) Applicant: ENTIT SOFTWARE LLC, Sanford, NC (US)

(72) Inventors: Avigad Mizrahi, Yehud (IL); Omer Frieman, Yehud (IL); Simon Rabinowitz, Yehud (IL)

(73) Assignee: Micro Focus LLC, Santa Clara, CA (US)

(*) Notice: Subject to any disclaimer, the term of this patent is extended or adjusted under 35 U.S.C. 154(b) by 652 days.

(21) Appl. No.: 15/546,072

(22) PCT Filed: Feb. 26, 2015

(86) PCT No.: PCT/US2015/017765
§ 371 (c)(1),
(2) Date: Jul. 25, 2017

(87) PCT Pub. No.: WO2016/137470
PCT Pub. Date: Sep. 1, 2016

(65) Prior Publication Data
US 2018/0004733 A1    Jan. 4, 2018

(51) Int. Cl.
G06F 40/51 (2020.01)
G06F 9/451 (2018.01)
G06F 40/30 (2020.01)
G06F 40/58 (2020.01)

(52) U.S. Cl.
CPC .............. *G06F 40/51* (2020.01); *G06F 9/454* (2018.02); *G06F 40/30* (2020.01); *G06F 40/58* (2020.01)

(58) Field of Classification Search
CPC ...... G06F 17/2872; G06F 8/38; G06F 17/289; G06F 17/2854; G10L 15/005
See application file for complete search history.

(56) References Cited

U.S. PATENT DOCUMENTS

| | | | | |
|---|---|---|---|---|
| 5,974,371 | A * | 10/1999 | Hirai | G06F 17/289 704/2 |
| 6,530,039 | B1 * | 3/2003 | Yang | G06F 11/3684 704/10 |
| 7,437,704 | B2 | 10/2008 | Dahne et al. | |
| 8,762,317 | B2 | 6/2014 | Sahibzada et al. | |
| 9,372,672 | B1 * | 6/2016 | Thomas | G06F 9/454 |
| 2002/0152081 | A1 * | 10/2002 | Kitamura | G06F 17/2735 704/277 |
| 2004/0260532 | A1 | 12/2004 | Richardson et al. | |

(Continued)

OTHER PUBLICATIONS

PCT; "International Search Report"; PCT/US2015/017765; dated Nov. 26, 2015; 10 pages.

*Primary Examiner* — Mark Villena

(57) ABSTRACT

In one example, a processor may: execute a machine-translation script to generate a machine-translation for a set of strings to be displayed upon execution of a subject application; cause a first display including a listing of testing actions to be performed by a test application; cause a second display that includes a GUI of the subject application, the second display including the set of strings; receive a user-translation for each of the strings via the GUI; and update the machine-translation script to include the received user-translations.

20 Claims, 6 Drawing Sheets

(56) References Cited

U.S. PATENT DOCUMENTS

| | | |
|---|---|---|
| 2005/0076342 A1 | 4/2005 | Levins et al. |
| 2006/0174196 A1* | 8/2006 | Zhang .................... G06F 9/454 |
| | | 715/236 |
| 2008/0077384 A1 | 3/2008 | Agapi et al. |
| 2009/0276206 A1 | 11/2009 | Fitzpatrick et al. |
| 2009/0327002 A1 | 12/2009 | Chapman et al. |
| 2013/0103384 A1 | 4/2013 | Hunter et al. |
| 2013/0144594 A1* | 6/2013 | Bangalore ........... G06F 17/2836 |
| | | 704/2 |
| 2014/0142917 A1 | 5/2014 | D'Penha |
| 2015/0134321 A1* | 5/2015 | Fennell .................. G06F 17/28 |
| | | 704/2 |

* cited by examiner

OBTAINING TRANSLATIONS UTILIZING TEST STEP AND SUBJECT APPLICATION DISPLAYS

BACKGROUND

Large scale web applications operating in a global environment should support multi-language translation and localization. The translation and localization process can require considerable production resources in terms of time and money.

DRAWINGS

DETAILED DESCRIPTION

Figure 1:
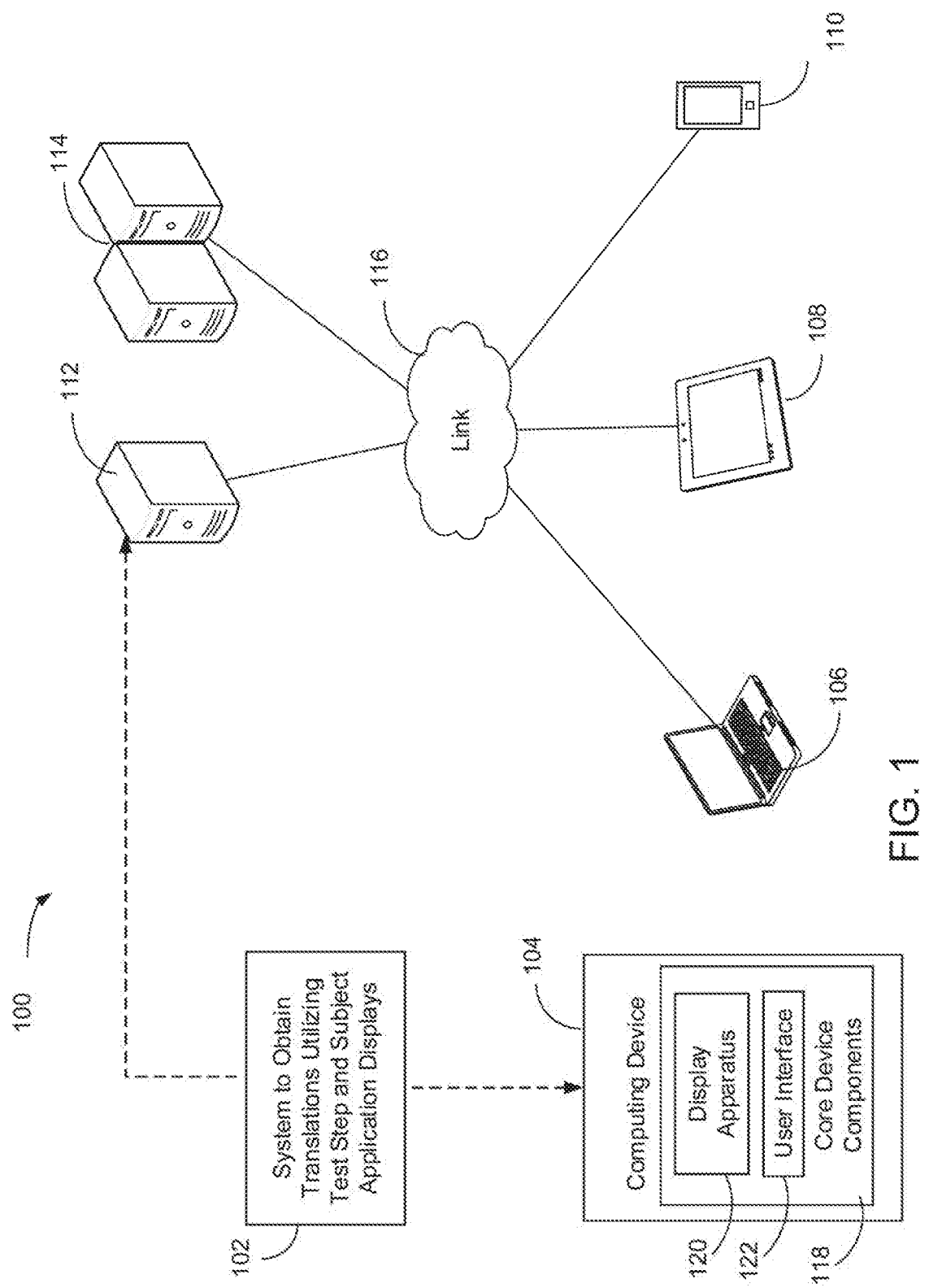
FIG. 1 is a block diagram depicting an example environment in which various examples of obtaining translations utilizing test step and subject application displays may be implemented.

INTRODUCTION: Typically, user-translation of software applications has been a process begun after the subject application has been developed, or even after initial delivery to production. This can be due in part to a manner in which many software production companies are organized. The human translators (referred to herein as "user translators") involved are often not part of the research and development group, and may not even be part of the software production company that developed the application (e.g., where user-translation services are outsourced). The resulting separation in functions can lead to a knowledge and familiarity gap with respect to an application's GUI and functionality. As a result, the user translators may attempt to effect translation of application features without a clear understanding of the feature and its logical and visual context.

Some software production companies utilize machine-translation services as part of the translation process. However, many current implementations of automated machine-translation of software application have been viewed as lacking from a quality perspective because strings in a machine-translation script may have multiple meaning depending upon context. Due in part to the differences in contexts of tested applications, current machine-translation API's and services typically lack an ability to meaningfully improve the translation algorithm based on user translators' corrections.

Thus, to date user-translations, machine-translations, and hybrid machine/user-translation of GUI components have been seen to suffer from lack of context that can lead to translations of insufficient quality. Such poor quality translations can impact product quality, sales and the company reputation. Poor translation quality can also lead to additional financial costs to the software production company due to re-translation processes and build fixes. Further, as application upgrades are released software production companies will suffer additional financial and timing impacts where user translators unfamiliar with an application's GUI expend time and resources to deploy latest application versions and learn their functionality, and then expend additional time and resources to update the machine-translation scripts.

To address these issues, various examples described in more detail below provide a system and a method for obtaining string translations utilizing test step and subject application displays. In one example of the disclosure, a machine-translation for each of a set of strings is determined, wherein each of the strings is to be displayed upon execution of a subject software application. A first display of a test step to be performed by a test application during execution of the subject application is caused. A second display of a state for the application that includes the set of strings is caused concurrent with the first display. A user-translation is obtained for each of the strings, the user-translations having been user-provided via a GUI included within the second display. A translation property file, e.g., a language-specific translation property file, included with or otherwise associated with the subject application is in turn amended to include the user-translations.

In an example, the first display and the second display are to occur, e.g., to be presented or to be displayed, at a same display device. In an example, the test step is to be performed by the test application concurrent with the provision of the second display.

In an example, the first display may include a GUI for receiving a command to pause or stop execution of the test application, and the user-translation for each of the set of strings may be obtained during a period or periods that execution of the subject application is paused or stopped.

In an example, the machine-translation for each of the set of strings may be determined utilizing a machine-translation script. In a particular example, an application context may be determined, and the machine-translation for the set of strings is to be determined according to the determined application context. In an example the machine-translation script that is utilized in determining the machine-translation is updated to include the user-translation that is obtained via the GUI within the second display.

In this manner, examples described herein can enable providers of software applications to provide for improved efficiency and better quality in translation subject software applications. The disclosed examples enable user translators to edit GUI strings while executing a feature in the subject software application. Disclosed examples enable a user translator to control a test application to run end to end GUI flows to navigate through the subject application. These GUI flows may be end to end tests produced by a separate quality assurance and/or research and development teams as part of the software testing and automation process. Translators not familiar with the application can thus, through implementation of the disclosed examples, easily navigate and translate the application understanding the visual context of the GUIs. In disclosed examples, the translation properties files for the application and a machine-translation script can be automatically updated as a user translator makes changes to correct a machine-translation.

Utilizing the disclosed examples of obtaining translations utilizing test step and subject application displays, software developers and translators can prioritize certain end to end GUI flows to be translated and then deploy such flows gradually to production. Accordingly, companies will not need to wait for all translation work to be completed at once and can develop applications working in a "continuous localization" mode. Thus, testing and translation application users', application developers', and application providers' satisfaction with products and services that utilize the disclosed examples, and with the physical and virtual devices that host or otherwise facilitate such products and services, should increase. Further end user satisfaction with the subject software applications that are tested and translated by a product or service that includes the disclosed examples (and that is subsequently improved as a result of the testing and translating) and the physical and virtual devices that are used to access or host such subject software applications, should increase.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of identification of application message types. The fourth section, labeled "Operation," describes steps taken to implement various examples.

ENVIRONMENT: FIG. 1 depicts an example environment 100 in which examples may be implemented as a system 102 for identification of application message types. Environment 100 is shown to include computing device 104, client devices 106, 108, and 110, server device 112, and server devices 114. Components 104-114 are interconnected via link 116.

Link 116 represents generally, any infrastructure or combination of infrastructures to enable an electronic connection, wireless connection, other connection, or combination thereof, to enable data communication between components 104-114. Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally any computing device with which a user may interact to communicate with other client devices, server device 112, and/or server devices 114 via link 116. Server device 112 represents generally any computing device to serve an application and corresponding data for consumption by components 104-110 and 114. Server devices 114 represent generally a group of computing devices collectively to serve an application and corresponding data for consumption by components 104-110 and 112.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming to enable obtaining translations utilizing test step and subject application displays. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. For example, components that implement the machine translation engine 202 functionality of determining a machine-translation for each of the plurality of strings may be included within computing device 104. Continuing with this example, components that implement the first display engine 204 functionality of causing the first display of a test step to be performed by a test application during execution of the subject application, and the second display engine 206 functionality of concurrent with the first display causing a second display of a state for the subject application that includes the plurality of strings, and the user-translation engine 208 functionality of obtaining a user-translation for each of the strings, the user-translations provided via the GUI included within the second display, and the property file engine 210 functionality of amending the translation property file associated with the subject application to include the user-translations may be components included within a server device 112. Other distributions of system 102 across computing device 104, client devices 106-110, server device 112, and server devices 114 are possible and contemplated by this disclosure. It is noted that all or portions of system 102 to enable obtaining translations utilizing test step and subject application displays may also be included on client devices 106, 108 or 110.

Figure 2:
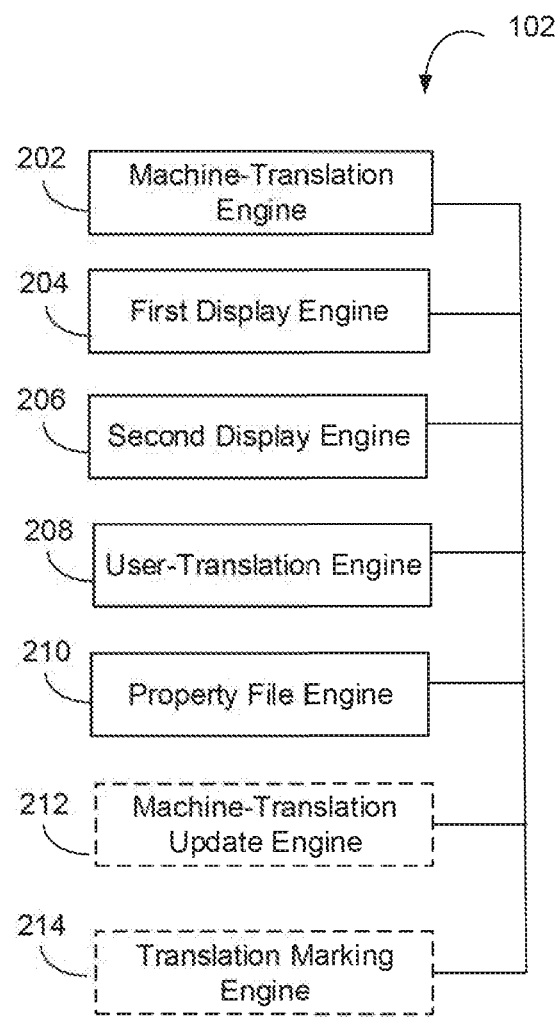
FIG. 2 is a block diagram depicting an example of a system to enable obtaining translations utilizing test step and subject application displays.
Figure 3:
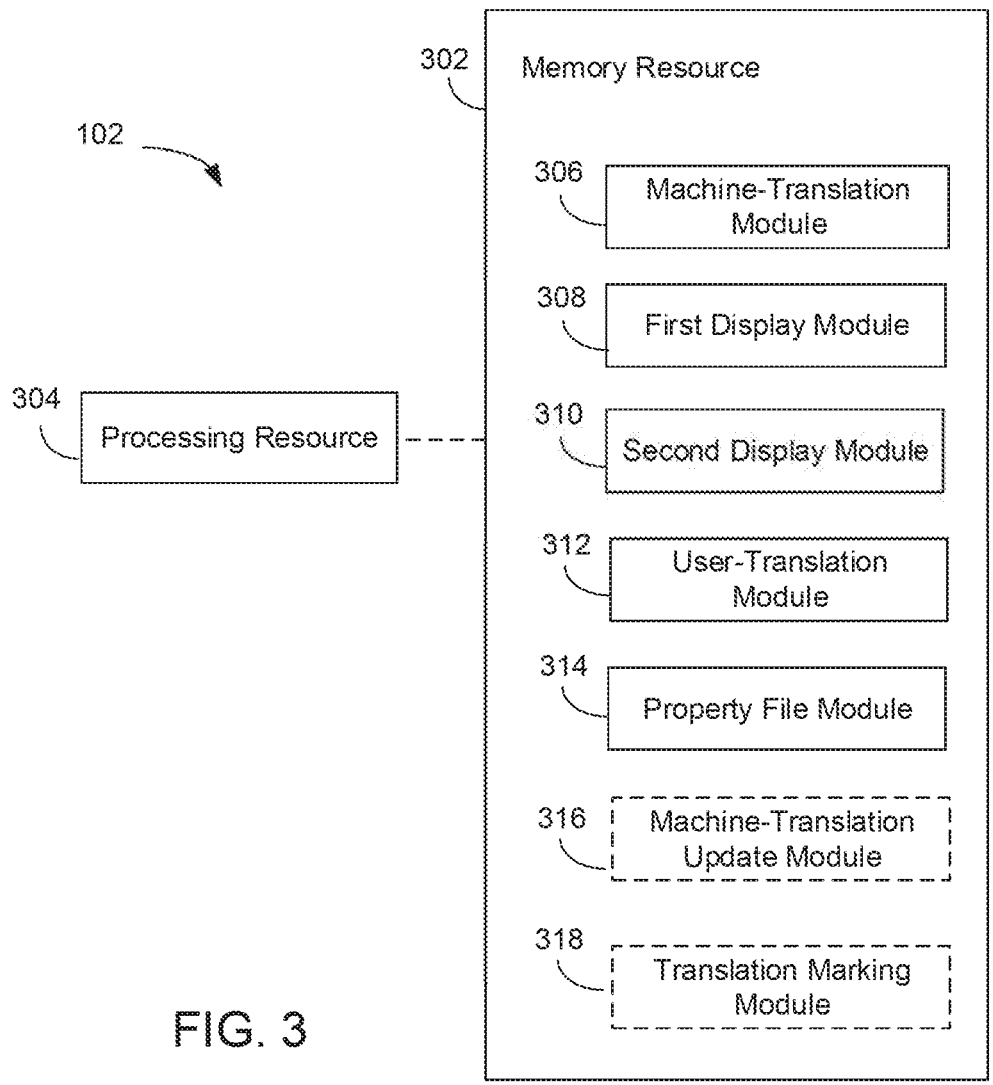
FIG. 3 is a block diagram depicting a memory resource and a processing resource to implement an example of obtaining translations utilizing test step and subject application displays.

COMPONENTS: FIGS. 2 and 3 depict examples of physical and logical components for implementing various examples. In FIG. 2 various components are identified as engines 202, 204, 206, 208, 210, 212, and 214. In describing engines 202-214 focus is on each engine's designated function. However, the term engine, as used herein, refers generally to a combination of hardware and programming to perform a designated function. As is illustrated later with respect to FIG. 3 the hardware of each engine, for example, may include one or both of a processor and a memory, while the programming may be code stored on that memory and executable by the processor to perform the designated function.

FIG. 2 is a block diagram depicting components of a system 102 for obtaining translations utilizing test steps and subject application displays. In this example, system 102 includes machine-translation engine 202, first display engine 204, second display engine 206, user-translation engine 208, property file engine 210, machine-translation update engine 212, and translation engine 214. In performing their respective functions, engines 202-214 may access a data repository, e.g., any memory accessible to system 102 that can be used to store and retrieve data.

In an example, machine-translation engine 202 represents generally a combination of hardware and programming to determine a machine-translation for each of a set of strings, wherein the strings are for display during execution of a subject application. As used herein, "software application" and "application" are used synonymously, and refer generally to a web application, mobile application, software application, firmware application, or other programming that executes at, or is accessible at, a computing device. As used herein, "display" refers generally to an exhibition or presentation caused by a computer for the purpose of perception by a user. In an example, a display may be or include a GUI display to be presented at a computer monitor, touchscreen, or other electronic display device. As used herein, a "string" refers generally to sequence of elements for display, typically characters, including, but not limited to letters, numerical digits, punctuation marks (such as "." or "-"), and whitespaces. As used herein, "machine-translation" of a string refers generally to a substitution or pairing of words or other elements of one natural language for words or other elements of another natural language. In examples, such substitution or pairing is caused by execution of a machine-translation script at a computer system. As used herein, a "machine-translation script" refers generally to any computer program to effect translation of strings, without limitation with respect to program size or the programming language in which the script is written.

Continuing with the example of FIG. 2, first display engine 204 represents generally a combination of hardware and programming to cause to occur at a display device a first display of a test step to be performed by a test application during execution of the subject application. As used herein, a "test step" refers generally to any one of a series of actions, processes, or measures taken to be performed by a test, application to accomplish testing of an application.

Continuing with the example of FIG. 2, second display engine 206 represents generally a combination of hardware and programming to cause to occur at a display device a second display of a state for the subject application that includes the set of strings. A used herein, a "state" for an application refers generally to a particular condition, stage, or configuration that the subject application is in, relative to another condition, stage or configuration that the subject application would be in if a property of the subject application is changed. In examples, a property or properties of a GUI may be changed, thereby causing a change in states of the subject application state, as a result of a user performing actions upon the GUI via a user interface (e.g., a user entering text in a text box property of the GUI, or manipulating a non-textual property (e.g. a check box or drop-down menu) utilizing a mouse, touchpad, or touchscreen or other input apparatus). In other examples, a change in states for a subject application may be caused by an event other than user interaction with a GUI, including but not limited to a passage of time, input from a sensor at the mobile device, or a response to any other stimulus.

In an example, second display engine is to cause the second display concurrent with the first display caused by the first display engine 204. As used herein, "concurrent" causing of a first display and a second display refers generally to the first and second displays being caused to occur contemporaneously or with overlap for some period of time. It is not necessary that the first and second displays overlap in time for the entirety of their provisions. For example, as "concurrent" is used herein a first display that is to be caused to occur for 10 seconds and a second display that caused to occur for 5 seconds are said to be concurrently caused if the first and second displays will be occur contemporaneously or with overlap in time for 3 seconds, or for any other time period that is a positive number.

In an example, first display engine 204 is to obtain a user-initiated instruction to begin a quality assurance test upon the subject application. In this example, the translation system 102 may be part of an integrated development/quality assurance environment, such that first display engine 204 causes the first display and second display engine 206 causes the second display responsive to receipt of the instruction to begin the quality assurance test.

In an example the first and second displays are caused to occur at a same display device. In other examples, the first and second displays may be caused to occur at distinct display devices that are concurrently accessible to a user translator. As used herein, a "display device" refers generally to any combination of hardware and programming configured to exhibit or present the message or other information for perception by a user, and can include, but is not limited to, a visual, tactile or auditory display. The display device may be a monitor, a touchscreen, a projection device, or other means of presenting a visual display of a message.

Continuing with the example of FIG. 2, user-translation engine 208 represents generally a combination of hardware and programming to obtain a user-translation for each of the set of strings included within the state for the subject application. As used herein, a "user-translation" refers generally to a translation provided by a human translator (also referred to herein as a "user-translator"). The obtained user-translations are translations that were provided by a user translator via a translation-interface GUI included within the second display provided by second display engine 206. As used herein, "graphic user interface" and "GUI" are used synonymously, and refer generally to any type of display caused by an application that can enable a user to interact with the application via visual properties of the display. In examples the GUI may include be or include, but is not limited to, an interactive text field, a list box, a check box, a dropdown list, an interactive button, a table control, and/or another interface.

In a particular example, wherein the first display caused by first display engine 204 includes a navigation GUI for receiving a command to pause or stop execution of the test application, user-translation engine 208 may obtain the user-translation for each string of the set of strings during a period that execution of the subject application is paused or stopped pursuant to user-interaction with the navigation GUI.

Continuing with the example of FIG. 2, property file engine 210 represents generally a combination of hardware and programming to amend a translation property file included with, or otherwise associated with, the subject application to include the obtained user-translations. As used herein, a "translation property file" or "property file" refers generally to any computer file for storing user-provided translations for application strings. In examples, such a translation property file may be referred to as an internationalization property file, a localization property file, a property resource bundle, or an "i18n" property file.

In examples, the translation property file that is amended is a language-specific property file (e.g., a translation property file specific to the English Language, to the Spanish language, or the Hebrew language, etc.). In examples, property file engine 210 may amend the translation property file by adding the user-translations to the property file. In another example, the translation property file may include the determined machine-translations for the subject application, and property file engine 210 may amend the property file by replacing machine-translations for a set of strings with user-translations for the set of strings.

Continuing with the example of FIG. 2, in examples, system 102 may include a machine-translation update engine 212. Machine-translation update engine 212 represents generally a combination of hardware and programming to update a machine-translation script (e.g., the script that was utilized by machine-translation engine 202 to determine the machine-translation for each of the set of strings) to include the obtained user-translations. In this manner, each iteration of determining a machine-translation for a set of strings and obtaining a verifying user-translation for each of the strings can add positive/negative information that improves the machine-translation script.

Continuing with the example of FIG. 2, in examples, system 102 may include a translation marking engine 214. Translation marking engine 214 represents generally a combination of hardware and programming to mark the subject application as translated, the marking occurring responsive to receipt of data indicative that execution of the test application has completed. In another example, translation marking engine 214 may mark the subject application as translated after receiving data confirming that a user-translation has been obtained for each of the set of strings. In yet another example, translation marking engine 214 may mark the subject application as translated after receiving data confirming that a translation property file has been amended to include user-translations for each of the strings of the set of strings.

In the foregoing discussion of FIG. 2, engines 202-214 were described as combinations of hardware and programming. Engines 202-214 may be implemented in a number of fashions. Looking at FIG. 3 the programming may be processor executable instructions stored on a tangible memory resource 302 and the hardware may include a processing resource 304 for executing those instructions. Thus memory resource 302 can be said to store program instructions that when executed by processing resource 304 implement system 102 of FIG. 2.

Memory resource 302 represents generally any number of memory components capable of storing instructions that can be executed by processing resource 304. Memory resource 302 is non-transitory in the sense that it does not encompass a transitory signal but instead is made up of more or more memory components to store the relevant instructions. Memory resource 302 may be implemented in a single device or distributed across devices. Likewise, processing resource 304 represents any number of processors capable of executing instructions stored by memory resource 302. Processing resource 304 may be integrated in a single device or distributed across devices. Further, memory resource 302 may be fully or partially integrated in the same device as processing resource 304, or it may be separate but accessible to that device and processing resource 304.

In one example, the program instructions can be part of an installation package that when installed can be executed by processing resource 304 to implement system 102. In this case, memory resource 302 may be a portable medium such as a CD, DVD, or flash drive or a memory maintained by a server from which the installation package can be downloaded and installed. In another example, the program instructions may be part of an application or applications already installed. Here, memory resource 302 can include integrated memory such as a hard drive, solid state drive, or the like.

In FIG. 3, the executable program instructions stored in memory resource 302 are depicted as machine-translation module 306, first display module 308, second display module 310, user-translation module 312, property file module 314, machine-translation update module 316, and translation marking module 318. Machine-translation module 306 represents program instructions that when executed by processing resource 304 may perform any of the functionalities described above in relation to machine-translation engine 202 of FIG. 2. First display module 308 represents program instructions that when executed by processing resource 304 may perform any of the functionalities described above in relation to first display engine 204 of FIG. 2. Second display module 310 represents program instructions that when executed by processing resource 304 may perform any of the functionalities described above in relation to second display engine 206 of FIG. 2. User-translation module 312 represents program instructions that when executed by processing resource 304 may perform any of the functionalities described above in relation to user-translation engine 208 of FIG. 2. Property file module 314 represents program instructions that when executed by processing resource 304 may perform any of the functionalities described above in relation to property file engine 210 of FIG. 2. Machine-translation update module 316 represents program instructions that when executed by processing resource 304 may perform any of the functionalities described above in relation to machine-translation update engine 212 of FIG. 2. Translation marking module 318 represents program instructions that when executed by processing resource 304 may perform any of the functionalities described above in relation to translation marking engine 214 of FIG. 2.

Figure 4:
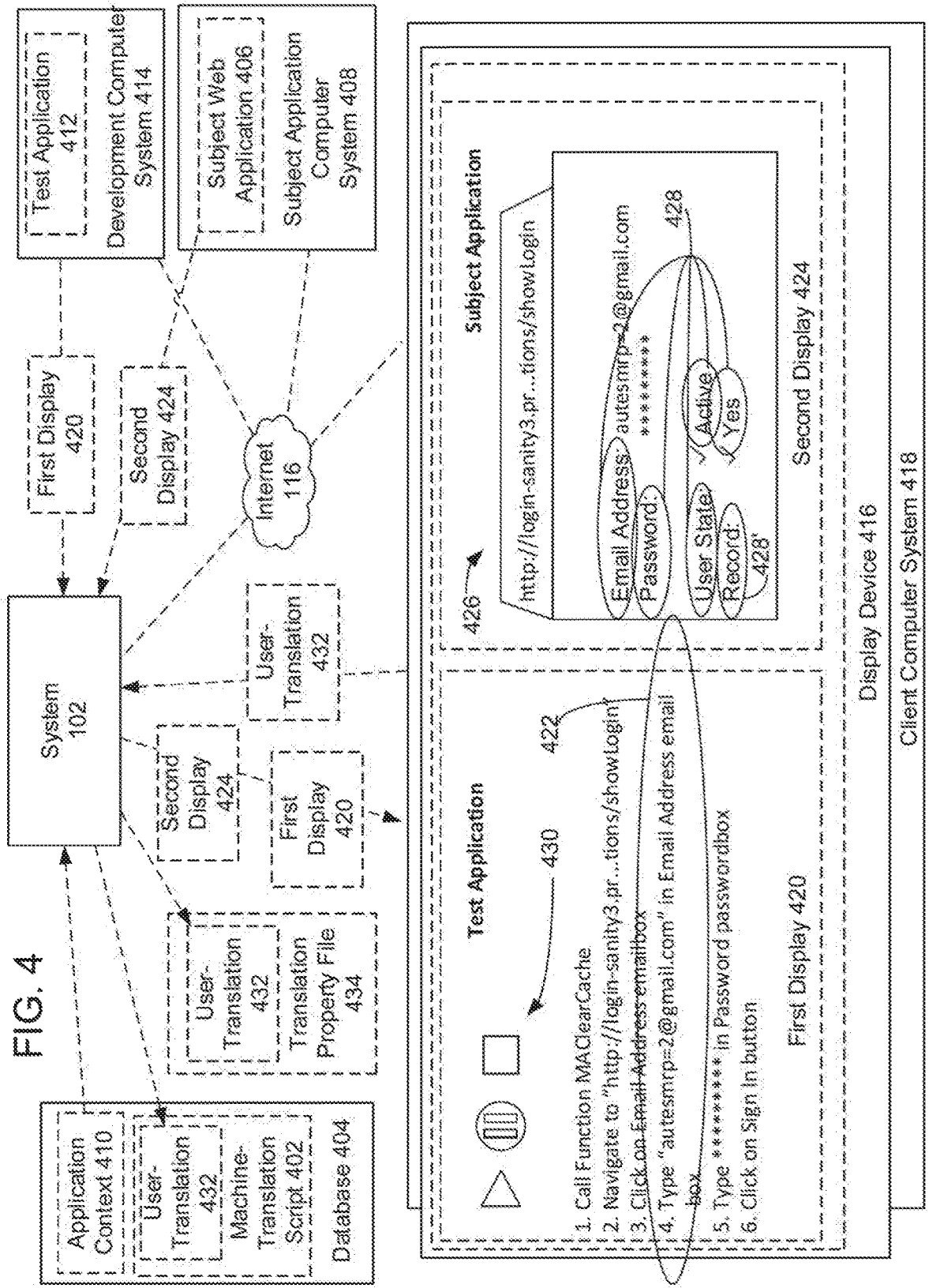
FIG. 4 illustrates an example of obtaining user-translations utilizing test step and subject application displays, including determining machine-translations for the plurality of strings according to an application context, and including updating a machine-translation script to include the obtained user-translations.

ILLUSTRATIVE EXAMPLE: FIG. 4, in view of FIGS. 1 and 2, illustrates an example of translation system 102 for obtaining of translations utilizing test step and application displays. In this example, translation system 102, hosted at a computing device such as server 112 (FIG. 1) or distributed over a set of computing devices such as server system 114 (FIG. 1), accesses, via an internet 116, a language-specific machine-translation script 402 stored at a database 404. Translation system 102 accesses, via internet 116, a subject web application 406 hosted at a subject application computer system 408. In this example, translation system 102 analyzes the subject application 406 to determine an application context 410 for the subject application 406. As used herein, an "application context" refers generally to data representative of circumstance, history, function or other information that serves as a descriptor for type or use of a software application. For instance, a web application for providing weather information to user may have an associated context of "weather," Likewise, an application for use by air traffic controller users to help in directing air traffic and communicating with aircraft might have an associated context of "air traffic management."

Translation system 102 in turn utilizes the machine-translation script 402 to determine a machine-translation for each of a set of strings that are to be displayed upon execution of the subject application 408. The machine-translation script 402 determines the machine-translation for the strings according to the application context. For instance, a string "user state" may suggest or indicate a geography when displayed according to a subject application that has a context of "weather" (e.g., "user state=Virginia"). Likewise, the string "user state" may suggest or indicate a state of being or circumstance when displayed according to a subject application that has a context of "air traffic maintenance" (e.g., "user state=in-flight").

Continuing with the example of FIG. 4, translation system 102 accesses a test application 412 hosted at a development computer system 414, and causes, at a display device 416 included within a client computer system 418, a first display 420 of a test step 422 to be performed by the test application 412 during concurrent execution of the subject application 406. In this example, the test step 422 is a test step of populating an email address into an "Email Address" email box GUI that the subject application is to cause to be displayed. In this example, the first display 420 additionally includes a navigation GUI 430 for receiving user commands to start, pause, and stop execution of the test application 412. Translation system 102 causes, concurrent with provision of the first display 420, a second display 424 of an application state 426 associated with the test step 422. The second display 424 includes the set of strings 428 and 428', and is to occur at the display device 416 concurrent with the first display 420.

Translation system 102 acquires a user-translation 432 for each of the strings. The user-translations are translation or correction strings that were user-provided via user interaction with a GUI within the second display 424. In an example, a user may interact with a text field GUI 428' to provide a translation string of "Record" to correct a string "DVD" that was a machine-translation string incorrectly generated by translation system 102 due to the machine-translation script applying a translation in a faulty context. Translation system 102 in turn amends a translation property file 434 associated with the subject application to include the user-translations.

Continuing with the example of FIG. 4, translation system 102 updates the machine-translation script 402 at database 404 to include the acquired user-translations 432. In this manner, the machine-translation script can be updated, and over time will suggest more accurate machine-translations for other subject applications under translation in view of the context for the respective subject application.

Figure 5:
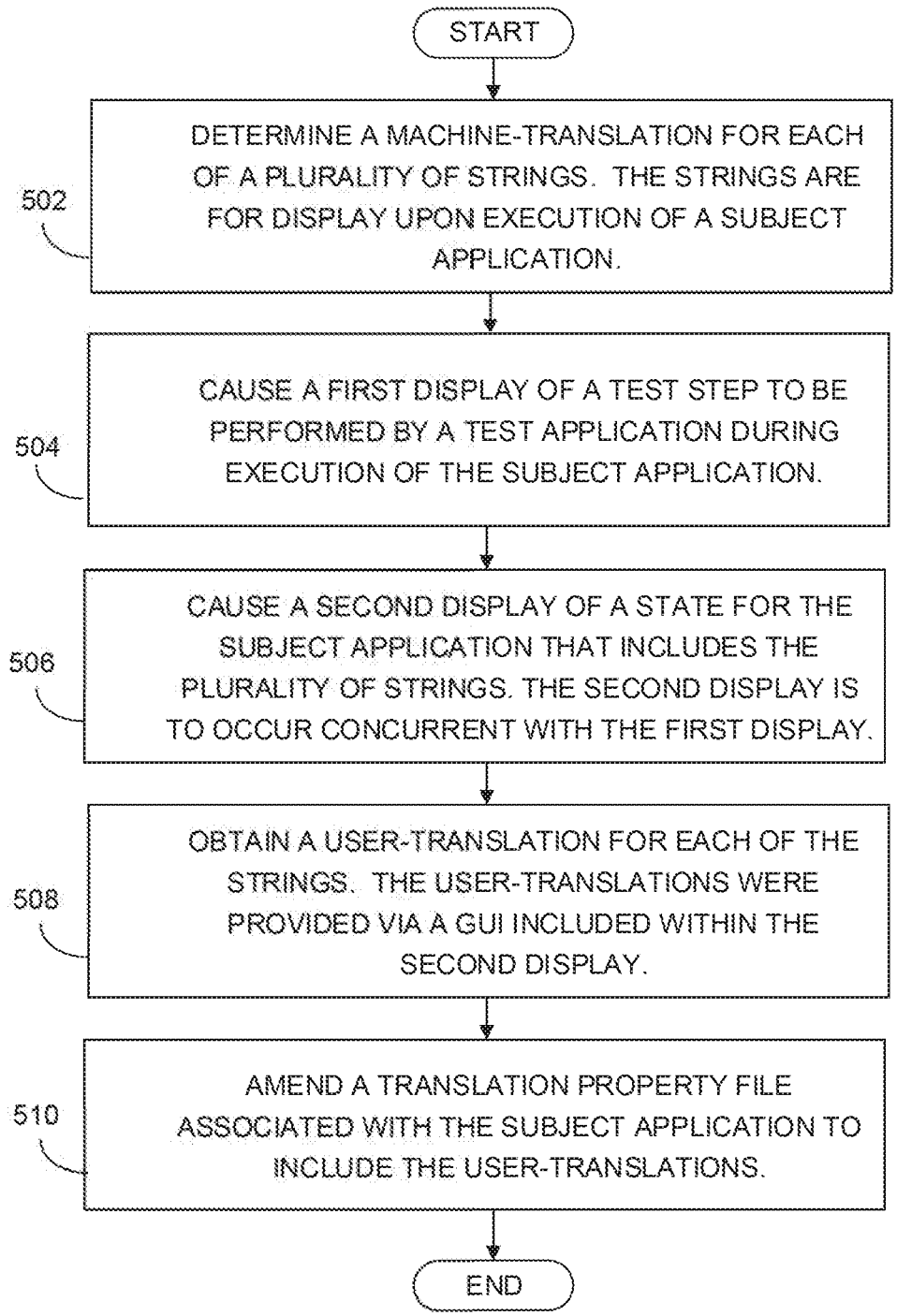
FIG. 5 is a flow diagram depicting steps taken to implement an example of obtaining translations utilizing test step and subject application displays.

OPERATION: FIG. 5 is a flow diagram of steps taken to implement a method for identifying application message types. In discussing FIG. 5, reference may be made to the components depicted in FIGS. 2 and 3. Such reference is made to provide contextual examples and not to limit the manner in which the method depicted by FIG. 5 may be implemented. A machine-translation for each of a plurality of strings is determined. The strings are for display upon execution of a subject application (block 502). Referring back to FIGS. 2 and 3, machine-translation engine 202 (FIG. 2) or machine-translation module 306 (FIG. 3), when executed by processing resource 304, may be responsible for implementing block 502.

A first display of a test step to be performed by a test application during execution of the subject application is caused (block 504). Referring back to FIGS. 2 and 3, first display engine 204 (FIG. 2) or first display module 308 (FIG. 3), when executed by processing resource 304, may be responsible for implementing block 504.

A second display of an application state associated with the test step, the second display including the plurality of strings, is caused to occur concurrent with the first display (block 506). Referring back to FIGS. 2 and 3, second display engine 208 (FIG. 2) or second display module 310 (FIG. 3), when executed by processing resource 304, may be responsible for implementing block 506.

A user-translation for each of the strings is obtained. The user-translations were provided via a GUI included within the second display (block 508). Referring back to FIGS. 2 and 3, user-translation engine 208 (FIG. 2) or user-translation module 312 (FIG. 3), when executed by processing resource 304, may be responsible for implementing block 508.

A translation property file associated with the subject application is amended to include the user-translations (block 510). Referring back to FIGS. 2 and 3, property file engine 210 (FIG. 2) or property file module 314 (FIG. 3), when executed by processing resource 304, may be responsible for implementing block 510.

Figure 6:
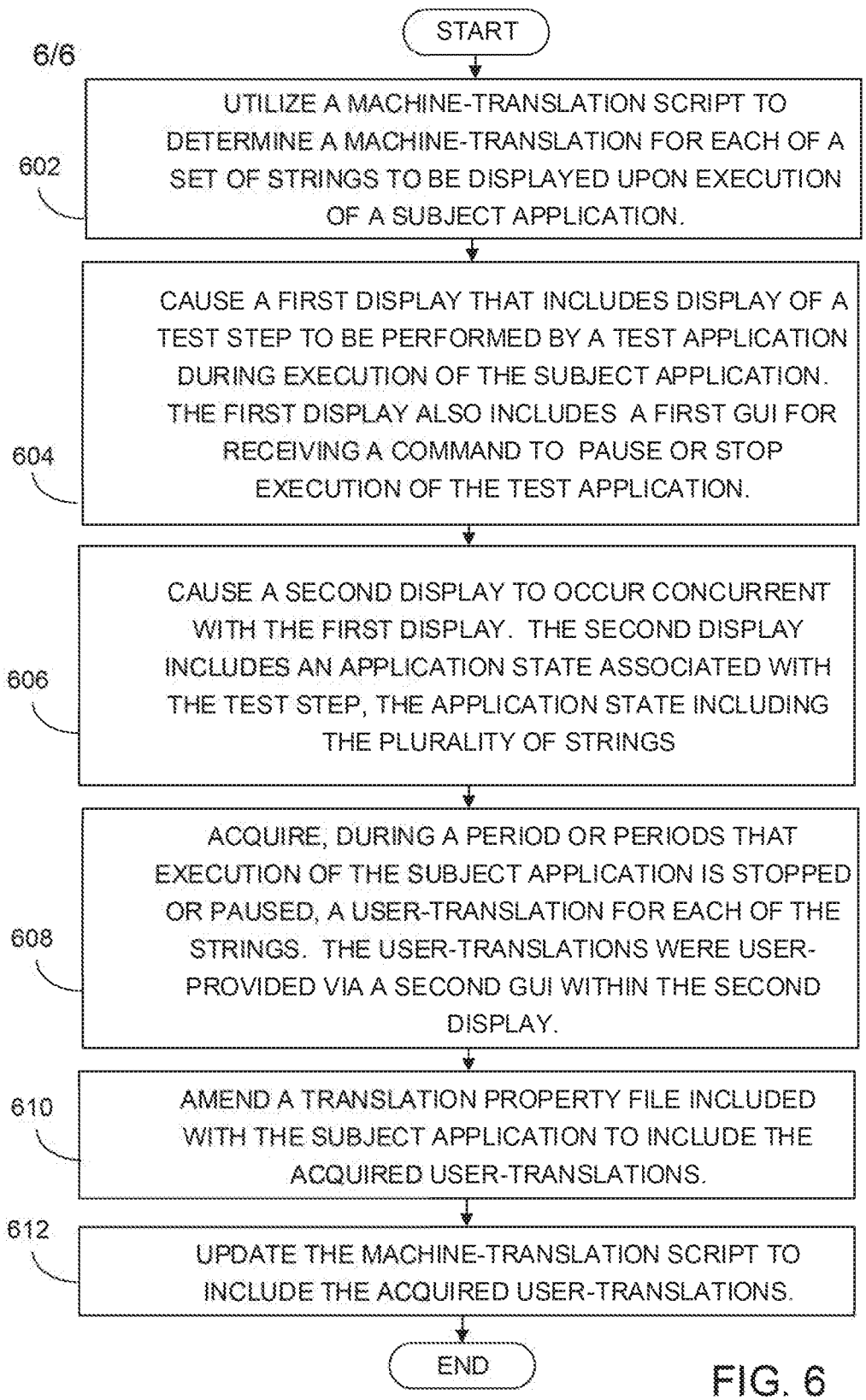
FIG. 6 is a flow diagram depicting steps taken to implement an example of obtaining user-translations during a period or periods that execution of the subject application is paused or stopped.

FIG. 6 is a flow diagram of steps taken to implement a method for identifying application message types. In discussing FIG. 6, reference may be made to the components depicted in FIGS. 2 and 3. Such reference is made to provide contextual examples and not to limit the manner in which the method depicted by FIG. 6 may be implemented. A machine-translation script is utilized to determine a machine-translation for each of a plurality of strings to be displayed upon execution of a subject application (block 602). Referring back to FIGS. 2 and 3, machine-translation engine 202 (FIG. 2) or machine-translation module 306 (FIG. 3), when executed by processing resource 304, may be responsible for implementing block 602.

A first display is caused. The first display includes a test step to be performed by a test application during execution of the subject application, and includes a first GUI for receiving a command to pause or stop execution of the test application (block 604). Referring back to FIGS. 2 and 3, first display engine 204 (FIG. 2) or first display module 308 (FIG. 3), when executed by processing resource 304, may be responsible for implementing block 604.

A second display is caused, the second display to occur concurrent with the first display. The second display includes an application state associated with the test step, the application state including the plurality of strings (block 606). Referring back to FIGS. 2 and 3, second display engine 206 (FIG. 2) or second display module 310 (FIG. 3), when executed by processing resource 304, may be responsible for implementing block 606.

A user-translation for each of the strings is acquired during a period or periods that execution of the subject application is paused or stopped. The user-translations were user-provided via a second GUI within the second display (block 608). Referring back to FIGS. 2 and 3, user-translation engine 208 (FIG. 2) or user-translation module 312 (FIG. 3), when executed by processing resource 304, may be responsible for implementing block 608.

A translation property file included with the subject application is amended to include the acquired user-translations (block 610). Referring back to FIGS. 2 and 3, property file engine 210 (FIG. 2) or properly file module 314 (FIG. 3), when executed by processing resource 304, may be responsible for implementing block 610.

The machine-translation script is updated to include the acquired user-translations (block 612). Referring back to FIGS. 2 and 3, machine-translation update engine 212 (FIG. 2) or machine-translation update module 316 (FIG. 3), when executed by processing resource 304, may be responsible for implementing block 612.

CONCLUSION: FIGS. 1-6 aid in depicting the architecture, functionality, and operation of various examples. In particular, FIGS. 1, 2, and 3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 5 and 6 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been shown and described with reference to the foregoing examples. It is to be understood, however, that other forms, details and examples may be made without departing from the spirit and scope of the invention that is defined in the following claims. All of the features disclosed in this specification (including any accompanying claims, abstract and drawings), and/or all of the steps of any method or, process so disclosed, may be combined in any combination, except combinations where at least some of such features and/or steps are mutually exclusive.

What is claimed is:

1. A system, comprising:
    a machine-translation engine, to determine a machine-translation for each of a plurality of strings, the plurality of strings for display upon execution of a subject application;
    a first display engine, to cause a first display of a test step to be performed by a test application during execution of the subject application;
    a second display engine, to cause, concurrent with the first display, a second display of a state for the subject application that includes the plurality of strings;
    a user-translation engine, to obtain a user-translation for each of the plurality of strings, the obtained user-translations being provided via a GUI included within the second display; and
    a property file engine, to amend a translation property file associated with the subject application to include the obtained user-translations.

2. The system of claim 1, wherein the first display engine is to obtain a user initiated instruction to begin a quality assurance test upon the subject application, and the first display engine is to cause the first display and the second display engine is to cause the second display responsive to receipt of the user initiated instruction.

3. The system of claim 1, wherein the test step is performed by the test application concurrent with provision of the second display by the second display engine.

4. The system of claim 1, wherein the GUI is a second GUI, wherein the first display includes a first GUI for receiving a command to pause or stop execution of the test application, and wherein the user-translation for each of the plurality of strings is obtained during a period that execution of the subject application is paused or stopped.

5. The system of claim 1, wherein the machine-translation engine is to determine the machine-translation for each of the plurality of strings utilizing a machine-translation script, and further comprising a machine-translation update engine to update the machine-translation script to include the obtained user-translations.

6. The system of claim 1, wherein the machine-translation engine is to determine an application context for the subject application, and is to determine the machine-translation for the plurality of strings according to the application context.

7. The system of claim 1, wherein an application context is determined according to a subject, a functionality, or an attribute of the subject application or of the state for the subject application.

8. The system of claim 1, further comprising a translation marking engine to mark the subject application as user-translated responsive to receipt of data indicative that execution of the test application has completed.

9. The system of claim 1, wherein the first display and the second display are to occur at a same display device.

10. The system of claim 1, wherein the translation property file is a language-specific property file.

11. The system of claim 1, wherein the translation property file includes the machine translation.

12. A memory resource storing instructions that when executed cause a processing resource to obtain user-translations utilizing test step and application state displays, the instructions comprising:
    a machine-translation module, that when executed causes the processing resource to utilize a machine-translation script to determine a machine-translation for each of a plurality of strings that are to be displayed upon execution of a subject application;
    a first display module, that when executed causes the processing resource to cause a first display of listing of testing actions to be performed by a test application during execution of the subject application;

a second display module, that when executed causes the processing resource to cause a second display, to occur concurrent with the first display, of a GUI of the subject application, the second display including the plurality of strings, the second display to be updated based on performance of a first testing action listed in the first display;

a user-translation module, that when executed causes the processing resource to receive a user-translation for each of the plurality of strings, the user-translations having been entered by a user via the GUI within the second display; and a property file module, that when executed causes the processing resource to amend a translation property file associated with the subject application to include received user-translations; and a machine-translation update module, that when executed causes the processing resource to update the machine-translation script to include received user-translations.

13. The memory resource of claim 12, wherein the testing actions are to be performed by the test application concurrent with provision of the second display by the second display module.

14. The memory resource of claim 12, wherein the machine-translation module when executed is to receive an application context for the subject application, and is to determine the machine-translation for the plurality of strings according to the application context.

15. The memory resource of claim 12, wherein the GUI within the second display is a second GUI, wherein the first display includes a first GUI for receiving a command to pause or stop execution of the test application, and wherein the user-translation for each of the plurality of strings is obtained during a period that execution of the subject application is paused or stopped.

16. A method for translating strings in a subject application, comprising:

excuting, by a processor, a machine-translation script to generate a machine-translation for each of a plurality of strings to be displayed upon execution of a subject application;

the processor causing a first display including a listing of testing actions to be performed by a test application during execution of the subject application, and including a first GUI for receiving a command to pause or stop execution of the test application;

the processor causing, concurrent with the first display, a second display that includes a second GUI of the subject application, the second display including the plurality of strings, the second display to be updated based on performance of the test step testing actions listed in the first display;

by the processor receiving, during a period or periods in which execution of the subject application is paused or stopped, a user-translation for each of the plurality of strings, the user-translations having been entered by a user via the second GUI within the second display;

the processor amending a translation property file included with the subject application to include the received user-translations; and the processor updating the machine-translation script to include the acquired received user-translations.

17. The method of claim 16, comprising concurrently causing the first display and the second display in distinct portions of a single display device.

18. The method of claim 16, comprising concurrently causing the first display and the second display in distinct display devices.

19. The method of claim 16, comprising:

receiving an application context for the subject application; and determining the machine-translation for the plurality of strings according to the application context.

20. The method of claim 16, comprising the test application populating a first field of the second GUI based on a first testing action listed in the first display.

* * * * *